United States Patent
Yonemichi

(10) Patent No.: US 9,592,582 B2
(45) Date of Patent: Mar. 14, 2017

(54) DEVICE FOR GRINDING SPHERICAL END FACE OF ROLLER-SHAPED WORKPIECE

(71) Applicant: JTEKT CORPORATION, Osaka-shi, Osaka (JP)

(72) Inventor: Kiyoshi Yonemichi, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 345 days.

(21) Appl. No.: 14/067,422

(22) Filed: Oct. 30, 2013

(65) Prior Publication Data

US 2014/0127978 A1    May 8, 2014

(30) Foreign Application Priority Data

Nov. 6, 2012  (JP) ................................. 2012-244410

(51) Int. Cl.
  *B24B 11/00*    (2006.01)
  *B23P 15/00*    (2006.01)
  *B24B 53/06*    (2006.01)

(52) U.S. Cl.
  CPC ............ *B24B 11/00* (2013.01); *B23P 15/003* (2013.01); *B24B 53/06* (2013.01)

(58) Field of Classification Search
  CPC ......... B24B 11/00; B24B 11/06; B24B 11/10; B24B 53/06; B23P 15/003
  USPC .................................... 451/50, 72, 283, 285
  See application file for complete search history.

(56) References Cited

U.S. PATENT DOCUMENTS

| 1,061,692 A | * | 5/1913 | Schmidt | .................. B24B 37/08 |
| | | | | 451/269 |
| 1,483,754 A | * | 2/1924 | Svensson | .................. B24B 5/26 |
| | | | | 451/284 |
| 2,482,485 A | * | 9/1949 | Hutchinson | ............... B24B 5/04 |
| | | | | 125/11.03 |
| 2,551,568 A | * | 5/1951 | Roshong | ................. B24B 11/00 |
| | | | | 125/11.03 |
| 2,572,187 A | * | 10/1951 | Olson | ..................... B24B 11/00 |
| | | | | 125/11.19 |

(Continued)

FOREIGN PATENT DOCUMENTS

| JP | A-60-006335 | 1/1985 |
| JP | 2008-030195 A | 2/2008 |
| JP | A-2011-152597 | 8/2011 |

OTHER PUBLICATIONS

Aug. 30, 2016 Office Action issued in Japanese Patent Application No. 2012-244410.

*Primary Examiner* — Larry E Waggle, Jr.
*Assistant Examiner* — Marcel Dion
(74) *Attorney, Agent, or Firm* — Oliff PLC

(57) ABSTRACT

An inner rotary retaining member has an annular outward rolling surface formed of part of a radially outward tapered surface centering on the central axis of a first rotary drive shaft. An outer rotary retaining member has an annular inward rolling surface formed of part of a radially inward tapered surface centering on the central axis of a second rotary drive shaft. The rolling surfaces are opposed to each other. A pocket that supports a workpiece such that the workpiece rotates and revolves as the retaining members rotate is formed at a portion of the carrier, the portion being positioned between the rolling surfaces. The central axis of the workpiece supported by the pocket is inclined relative to the central axis of the rotary drive shafts.

6 Claims, 6 Drawing Sheets

(56) References Cited

U.S. PATENT DOCUMENTS

| | | | | |
|---|---|---|---|---|
| 2,586,953 | A | * | 2/1952 | Johnson .................. B24B 11/00 451/180 |
| 3,505,766 | A | * | 4/1970 | Boettcher ............. B24B 37/102 451/283 |
| 4,590,712 | A | | 5/1986 | Sugiyama et al. |
| 5,025,595 | A | * | 6/1991 | Orain ...................... B24B 11/00 451/28 |
| 5,214,884 | A | * | 6/1993 | Kinoshita ............... B24B 37/02 451/269 |
| 2012/0269476 | A1 | * | 10/2012 | Akimoto ................. B23P 13/02 384/569 |
| 2012/0285018 | A1 | | 11/2012 | Higashi et al. |

* cited by examiner

DEVICE FOR GRINDING SPHERICAL END FACE OF ROLLER-SHAPED WORKPIECE

INCORPORATION BY REFERENCE

The disclosure of Japanese Patent Application No. 2012-244410 filed on Nov. 6, 2012, including the specification, drawings and abstract, is incorporated herein by reference in its entirety.

BACKGROUND OF THE INVENTION

1. Field of the Invention

The invention relates generally to a device for grinding a spherical end face of a roller-shaped workpiece, and more specifically to a grinding device for grinding a spherical end face of a roller-shaped workpiece, such as a workpiece for a tapered roller of a tapered roller bearing.

2. Description of Related Art

A grinding device 71 for grinding a spherical end face of a roller-shaped workpiece is described in Japanese Patent Application Publication No. 60-6335 (JP 60-6335 A). In the grinding device 71, a roller-shaped workpiece W is held by a disc-shaped carrier 72 horizontally disposed, and retained by an upper rotary retaining member (first rotary retaining member) 73 and a lower rotary retaining member (second rotary retaining member) 74, as shown in FIG. 6 and FIG. 7.

A C-shaped grinding wheel, of which the inner peripheral face (grinding face) is formed along the outer peripheral face of the carrier 72, is used as a grinding wheel 75. A workpiece inlet 76 and a workpiece outlet 77 are arranged at the opening of the C-shaped grinding wheel 75.

The upper rotary retaining member 73 is fixed to an upper rotary drive shaft 78, and rotates at a predetermined speed. The lower rotary retaining member 74 is fixed to a lower rotary drive shaft 79, and rotates at a predetermined speed. The upper rotary drive shaft 78 and the lower rotary drive shaft 79 rotate in the opposite directions. The upper rotary drive shaft 78 applies downward pressure to the upper rotary retaining member 73 with the use of a pressure cylinder (not shown).

As a grinding wheel used in a device for grinding a spherical end face of a roller-shaped workpiece, in addition to the foregoing C-shaped grinding wheel 75, a cup-shaped rotary grinding wheel is also known (Japanese Patent Application Publication No. 2011-152597 (JP 2011-152597 A)).

The conventional grinding device described above is large due to a large outside diameter of the carrier and/or a large outside diameter of the grinding wheel. Therefore, more compact grinding devices have been demanded. In addition, improvement in the machining accuracy of an end face of a roller-shaped workpiece has been demanded.

SUMMARY OF THE INVENTION

One object of the invention is to provide a more compact device for grinding a spherical end face of a roller-shaped workpiece, the device being configured to ensure higher machining accuracy.

An aspect of the invention relates to a device for grinding a spherical end face of a roller-shaped workpiece, including: a first rotary retaining member that is provided at a first rotary drive shaft and rotates at a predetermined speed; a second rotary retaining member that is provided at a hollow second rotary drive shaft disposed so as to be concentric with the first rotary drive shaft, and rotates at a predetermined speed; a carrier disposed so as to be rotatable relative to the first rotary retaining member and the second rotary retaining member; and a cup-shaped rotary grinding wheel disposed so as to be movable relative to the first rotary retaining member and the second rotary retaining member. Pressure is applied to the first rotary retaining member or the second rotary retaining member in an axial direction. One of the first rotary retaining member and the second rotary retaining member is an inner rotary retaining member that has an annular outward rolling surface formed of part of a radially outward tapered surface centering on a central axis of the rotary drive shafts, and the other one of the first rotary retaining member and the second rotary retaining member is an outer rotary retaining member that has an annular inward rolling surface faulted of part of a radially inward tapered surface centering on the central axis of the rotary drive shafts. The rolling surfaces are opposed to each other. A workpiece supporting portion that supports a workpiece such that the workpiece rotates and revolves as the retaining members rotate is formed at a portion of the carrier, the portion being positioned between the rolling surfaces. A central axis of the workpiece supported by the workpiece supporting portion is inclined relative to the central axis of the rotary drive shafts.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
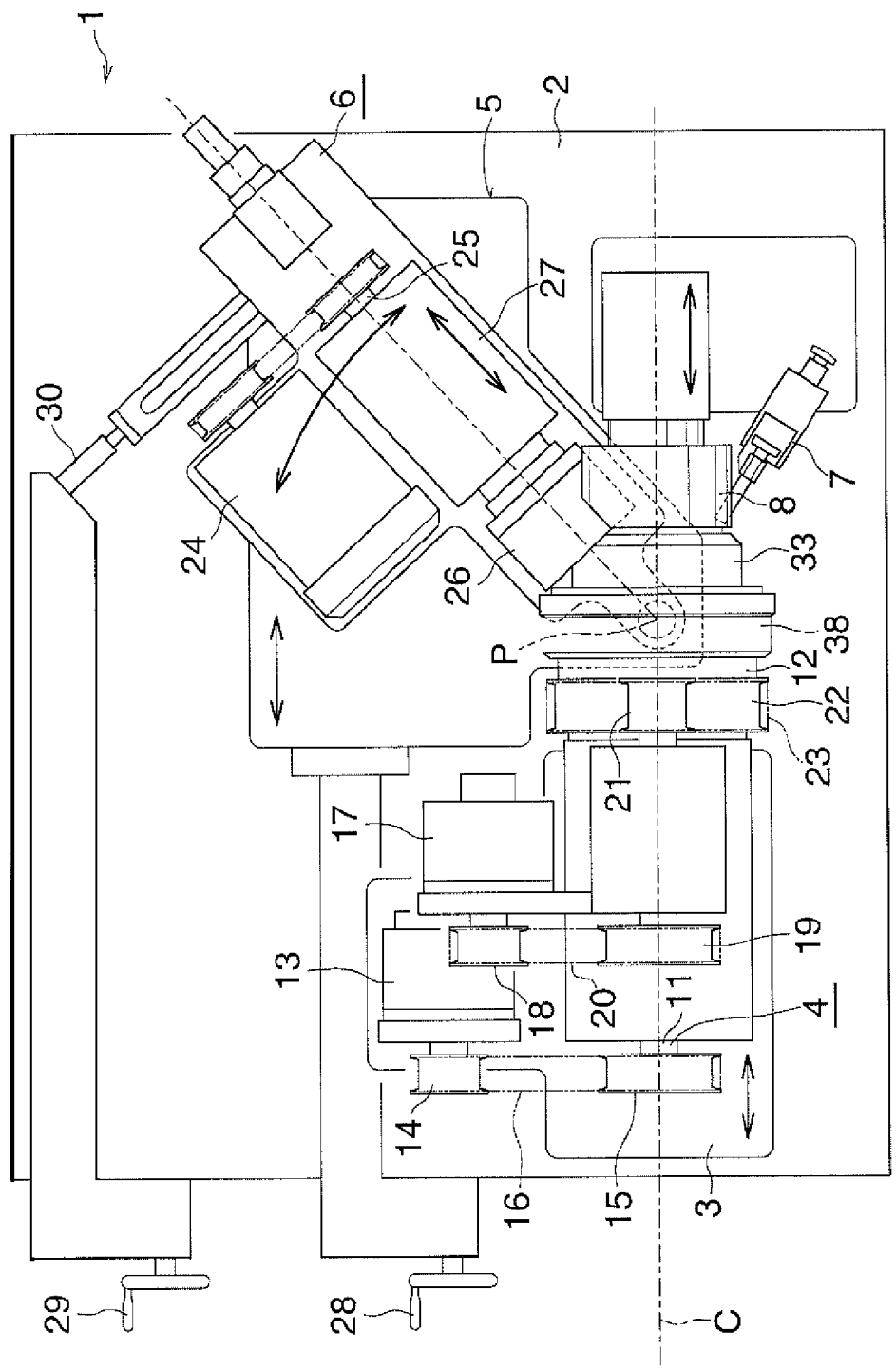
FIG. 1 is a plan view illustrating a device for grinding a spherical end face of a roller-shaped workpiece according to a first embodiment of the invention.

Hereinafter, an embodiment of the invention will be described with reference to the accompanying drawings. In the following description, "up-down direction" means the up-down direction in FIG. 2, and "lateral direction (right-left direction)" means the lateral direction (right-left direction) in FIG. 1.

FIG. 1 to FIG. 4 illustrate a grinding device 1 for grinding a spherical end face of a roller-shaped workpiece according to a first embodiment of the invention.

Figure 5:
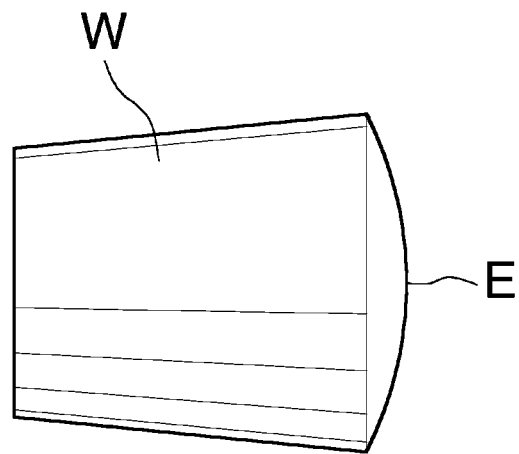
FIG. 5 is a front view illustrating an example of a workpiece.
Figure 6:
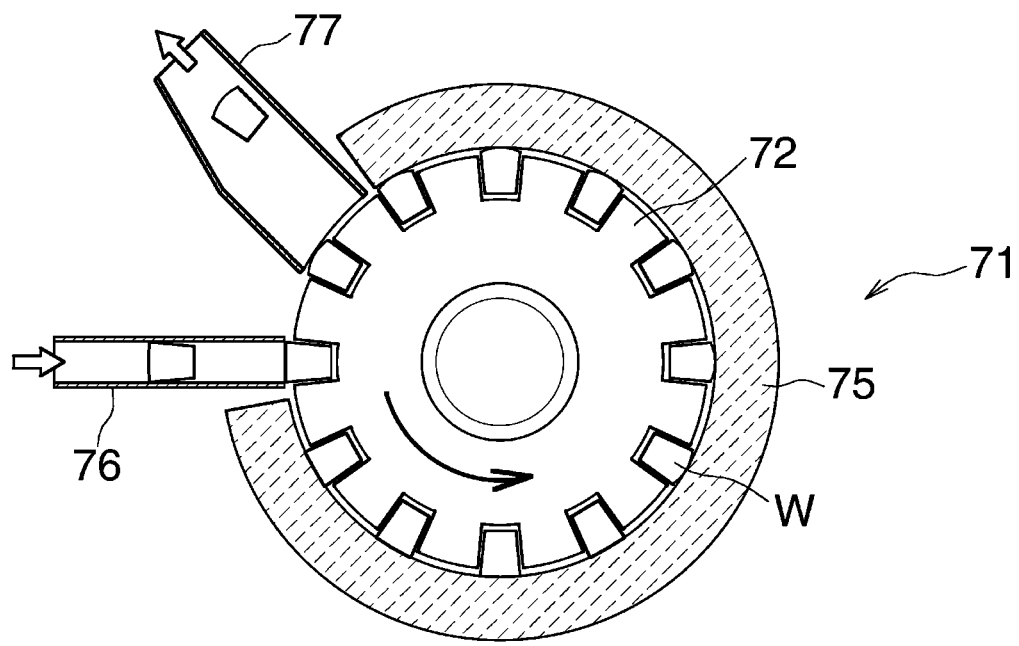
FIG. 6 is a cross sectional view illustrating main portions of an example of a conventional device for grinding a spherical end face of a roller-shaped workpiece.
Figure 7:
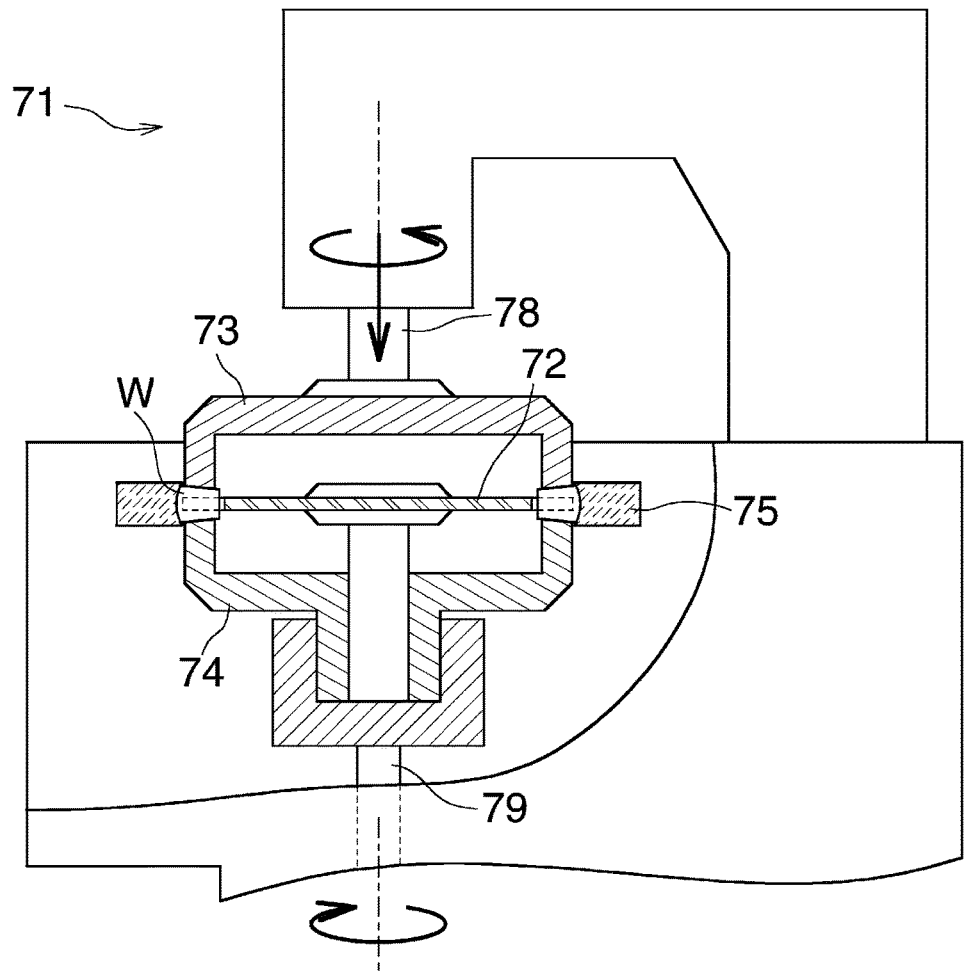
FIG. 7 is a sectional view illustrating the device in FIG. 6.

The grinding device 1 is suitable for grinding a spherical end face E of a roller-shaped workpiece W, such as a workpiece for a tapered roller (see FIG. 5) used in a tapered roller bearing.

The grinding device 1 includes a base 2, a main spindle 4, a grinding wheel spindle 6, a loader 7, and a workpiece guide 8. The main spindle 4 is provided horizontally so as to be parallel to a main spindle slide 3. The grinding wheel spindle 6 is provided on a grinding wheel slide 5. The loader 7 loads the workpiece W into the grinding device 1.

The main spindle 4 includes a first rotary drive shaft 11 and a hollow second rotary drive shaft 12. The first rotary drive shaft 11 is a solid shaft. The second rotary drive shaft 12 is disposed so as to be concentric with the first rotary drive shaft 11.

The first rotary drive shaft 11 is driven by the driving force generated by a first motor 13 and transmitted through a small-diameter pulley 14 located on the motor side, a large-diameter pulley 15 located on the first rotary drive shaft side, and a first timing belt 16 looped over the small-diameter pulley 14 and the large-diameter pulley 15. The first rotary drive shaft 11 is rotated in the counterclockwise direction in FIG. 4.

The second rotary drive shaft 12 is driven by the driving force generated by a second motor 17 and transmitted through a small-diameter pulley 18 located on the motor side, an intermediate large-diameter pulley 19, an intermediate small-diameter pulley 21, and a large-diameter pulley 22 located on the second rotary drive shaft side. The intermediate large-diameter pulley 19 is connected to the small-diameter pulley 18 by a second timing belt 20. The intermediate small-diameter pulley 21 rotates together with the intermediate large-diameter pulley 19. The large-diameter pulley 22 is connected to the intermediate small-diameter pulley 21 by a third timing belt 23. The large-diameter pulley 22 is formed integrally with the left portion of the second rotary drive shaft 12. The second rotary drive shaft 12 is rotated in a direction opposite to the rotation direction of the first rotary drive shaft 11, that is, in the clockwise direction in FIG. 4.

The grinding wheel spindle 6 includes a grinding wheel shaft 25, a cup-shaped rotary grinding wheel 26, and an infeed shaft 27. The grinding wheel shaft 25 is rotated by a motor 24. The rotary grinding wheel 26 is provided at the distal end of the grinding wheel shaft 25. The infeed shaft 27 moves the rotary grinding wheel 26 in the axial direction of the rotary grinding wheel 26.

The grinding wheel slide 5 is moved in a direction parallel to the main spindle 4 (in the lateral direction of the drawing) in response to an operation of a pivot handle 28. A mechanism (not shown) for moving the grinding wheel slide 5 is formed of a feed screw or the like, which is composed of a trapezoidal thread, and the grinding wheel slide 5 is slid as the feed screw is rotated.

The grinding wheel spindle 6 is pivoted about a pivot axis P, which is on a central axis C of the first rotary drive shaft 11 and the second rotary drive shaft 12 and which is orthogonal to the central axis C, by operating a pivot handle 29. A mechanism for pivoting the grinding wheel spindle 6 is formed of an actuator including, for example, a cylinder 30.

At the time of grinding, the grinding wheel slide 5 is positioned with the main spindle slide 3 fixed, and the grinding wheel spindle 6 is positioned such that the grinding wheel shaft 25 is set at a predetermined swivel angle. The infeed shaft 27 is set so as to be always advanced through fine feeding.

Figure 3:
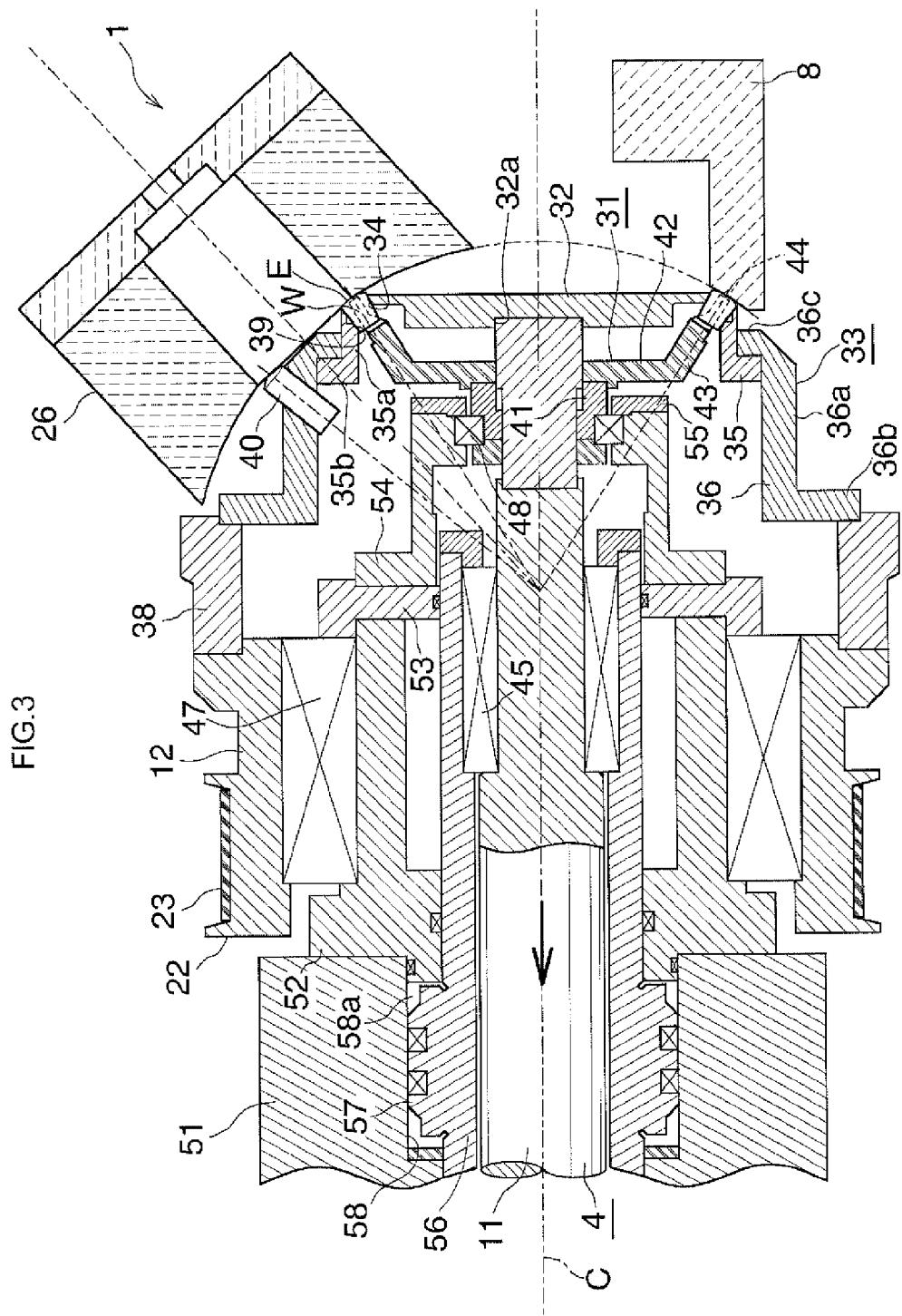
FIG. 3 is a longitudinal sectional view illustrating main portion illustrated in FIG. 2.

As shown in FIG. 3, the workpiece W is held on a disc-shaped carrier 31 and retained between an inner rotary retaining member (first rotary retaining member) 32 and an outer rotary retaining member (second rotary retaining member) 33.

The carrier 31 includes a cylindrical portion 41, a disc-shaped portion 42, and a tapered portion 43. The cylindrical portion 41 is fitted to the first rotary drive shaft 11 so as to be rotatable relative to the first rotary drive shaft 11. The disc-shaped portion 42 is orthogonal to the axial direction of the first rotary drive shaft 11. The tapered portion 43 extends from the outer circumferential edge of the disc-shaped portion 42 toward the distal end of the main spindle 4. A plurality of (twelve in the drawing) pockets (workpiece supporting portions) 44 is formed in the tapered portion 43 at regular intervals in the circumferential direction.

The inner rotary retaining member 32 has a disc shape, and is fixed to the first rotary drive shaft 11 when a circular recess 32a, which is formed in the left face of the central part of the inner rotary retaining member 32 is fitted to the distal end of the first rotary drive shaft 11. An annular outward rolling surface 34 is formed on the outer periphery of the inner rotary retaining member 32. The annular outward rolling surface 34 is formed of part of a radially outward tapered surface centering on the central axis C of the first rotary drive shaft 11.

The outer rotary retaining member 33 is formed in a generally cylindrical shape, and is formed of a first tubular member 35 and a second tubular member 36.

The first tubular member 35 is formed of a cylindrical portion 35a and a flange 35b formed at the left end of the cylindrical portion 35a. The second tubular member 36 is formed of a cylindrical portion 36a, an outward flange 36b, and an inward flange 36c. The cylindrical portion 36a has an inside diameter equal to the outside diameter of the flange 35b of the first tubular member 35. The flange 36b is provided at the left end of the cylindrical portion 36a. The flange 36c is provided at the right end of the cylindrical portion 36a, and fitted to the flange 35b of the first tubular member 35 from the right side.

The second tubular member 36 is fixed to the second rotary drive shaft 12 via a fitting member 38.

At the right end of the cylindrical portion 35a of the first tubular member 35, there is formed an annular inward rolling surface 39 formed of part of a radially inward tapered surface centering on the central axis C of the second rotary drive shaft 12, the central axis C coinciding with the central axis of the first rotary drive shaft 11.

A dressing tool 40 having a point diamond for dressing the rotary grinding wheel 26 is provided at a portion in the circumferential direction, of the cylindrical portion 36a of the second tubular member 36, the portion being opposed to the rotary grinding wheel 26.

A cylindrical first housing member 51, a cylindrical second housing member 52, a disc-shaped third housing member 53, a cylindrical fourth housing member 54, and a disc-shaped fifth housing member 55 arranged in this order from the left side in FIG. 3 constitute a generally cylindrical housing that supports the main spindle 4.

A cylindrical slider 56 urged leftward is provided between the inner peripheral faces of the first to the fourth housing members 51, 52, 53 and 54 and the outer peripheral face of the first rotary drive shaft 11.

A cylinder chamber 58 is formed radially inward of the inner periphery of the first housing member 51. A piston 57, which is fitted in the cylinder chamber 58 so as to be movable in the axial direction, is formed on the outer peripheral face of the slider 56. When fluid pressure, such as hydraulic pressure, is supplied to the right portion inside the cylinder chamber 58, the piston 57 in the cylinder chamber 58 is urged leftward and pressure is applied to the slider 56 leftward.

The slider 56 is driven such that the slider 56 does not rotate. The first rotary drive shaft 11 rotates relative to the slider 56. The movement of the first rotary drive shaft 11 in the axial direction is not restricted. The first rotary drive shaft 11 moves leftward together with the slider 56 as the slider 56 moves leftward. Thus, the inner rotary retaining member 32 fixed to the first rotary drive shaft 11 is urged leftward. As a result, a retaining force for retaining the workpiece W between the inner rotary retaining member 32 and the outer rotary retaining member 33 is obtained.

A bearing 45 is disposed between the first rotary drive shaft 11 and the slider 56. A bearing 47 is disposed between the second and the third housing members 52, 53 and the second rotary drive shaft 12. Thus, the second rotary drive shaft 12 is rotatably supported by the second housing member 52 and the third housing member 53. A ball bearing 48 is disposed between the right end of the fourth housing member 54 and the fifth housing member 55, and the cylindrical portion 41 of the carrier 31. Thus, the carrier 31 is rotatably supported by the fourth housing member 54 and the fifth housing member 55.

Figure 2:
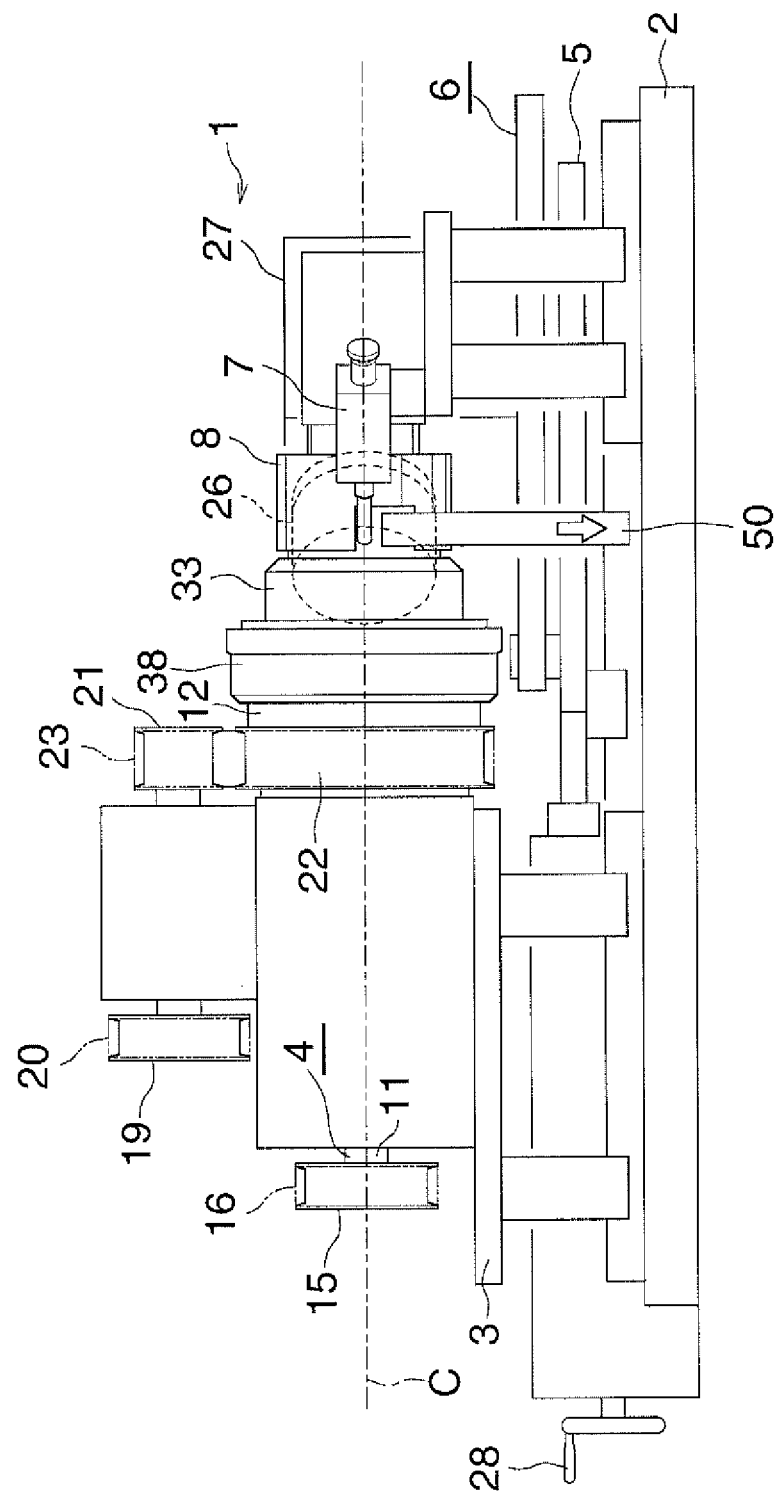
FIG. 2 is a front view of the device illustrated in FIG. 1.
Figure 4:
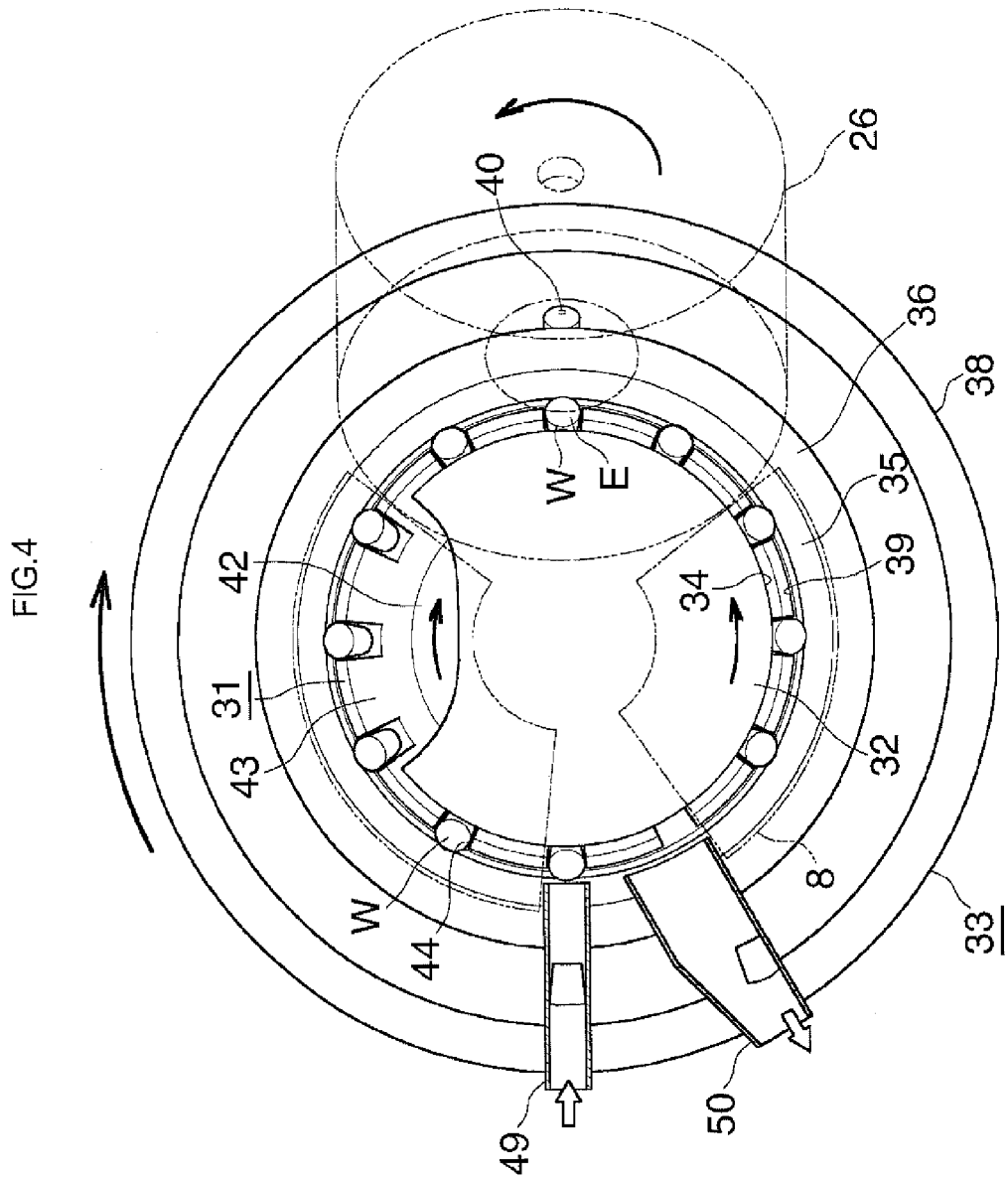
FIG. 4 is a right side view of the device illustrated in FIG. 3.

As shown in FIG. 2, the rotary grinding wheel 26 is disposed at a middle position in the up-down direction, at the height of the central axis C. As shown in FIG. 4, a workpiece inlet 49 and a workpiece outlet 50 are provided at positions approximately 180 degrees apart from the position at which the rotary grinding wheel 26 is disposed. The workpiece guide 8 is opposed to the carrier 31 from the axially outer side, at portions where the rotary grinding wheel 26, the workpiece inlet 49 and the workpiece outlet 50 are not provided.

The workpiece W is supplied through the workpiece inlet 49 and discharged through the workpiece outlet 50. The workpiece W falls through the workpiece inlet 49 into the pocket 44 of the carrier 31 under its own weight. At this time, a coolant is sprayed onto the workpiece W. Thus, the workpiece W is moved into the pocket 44 more reliably. The workpiece outlet 50 is provided with an ejecting cam (not shown) that pushes the workpiece W. By the ejecting cam, the self-weight of the workpiece W and the coolant, the workpiece W is reliably ejected from the pocket 44.

With the foregoing grinding device 1, the workpiece W is fitted into the pocket 44 with the large diameter-side end face E facing radially outward, and portions of the papered peripheral face of the workpiece W, which are 180 degrees apart from each other and which faces the respective retaining members 32, 33, are held by the respective retaining members 32, 33. The workpiece W revolves while rotating as the first rotary drive shaft 11 and the second rotary drive shaft 12 rotate in the opposite directions. The carrier 31 rotates relative to the first rotary drive shaft 11 as the workpiece W revolves. The revolving speed is set to a predetermined value by changing, as appropriate, the pulley ratio (reduction ratio) of the pulleys 14, 15, which drive the first rotary drive shaft 11, and the pulley ratios (reduction ratios) of the pulleys 18, 19, 21, 22, which drive the second rotary drive shaft 12.

The grinding wheel spindle 6 performs grinding on the workpiece W held in the pocket 44 of the carrier 31 by moving the infeed shaft 27 in the axial direction of the grinding wheel 26 while rotating the rotary grinding wheel 26 about the axis of the grinding wheel shaft 25.

The central axis of a workpiece lies in a plane that is orthogonal to the central axis of a rotary drive shaft in the conventional grinding device, whereas the central axis of the workpiece W is inclined with respect to the central axis C of the first and the second rotary drive shafts 11 and 12 in the grinding device 1 described above.

This arrangement reduces the outside diameter of the carrier 31. Further, the grinding wheel shaft 25 of the rotary grinding wheel 26 is also inclined with respect to the central axis C of the first and the second rotary drive shafts 11, 12. Therefore, it is possible to significantly reduce the outside diameter of a portion that includes the carrier 31 and the rotary grinding wheel 26.

Pressure is applied to the inner rotary retaining member 32 in the axial direction. Further, the inner rotary retaining member 32 has the annular outward rolling surface 34 formed of part of the radially outward tapered surface, and the outer rotary retaining member 33 has the annular inward rolling surface 39 formed of part of the radially inward tapered surface. Therefore, when the two rolling surfaces 34, 39 roll with the workpiece W held therebetween, both a force in the axial direction and a force in the radial direction act on the rolling surfaces 34, 39. As a result, it is possible to prevent reduction in the coaxiality between the inner rotary retaining member 32 and the outer rotary retaining member 33, thus improving the machining accuracy.

The axis of the grinding wheel shaft 25 and the central axis of the workpiece W need not cross on the central axis C of the first and the second rotary drive shafts 11, 12, that is, on the pivot axis P, and may therefore be shifted. If the axis of the grinding wheel shaft 25 and the central axis of the workpiece W are shifted, the curvature of the end face of the workpiece W changes (reduces). Thus, the curvature can be changed (adjusted) to a certain degree with the use of the same rotary grinding wheel 26. This increases the flexibility and the machining accuracy.

The dressing tool 40 provided on the outer rotary retaining member 33 allows the rotary grinding wheel 26 to be dressed during grinding. This prevents reduction in the accuracy of the rotary grinding wheel 26. Hence, the foregoing high machining accuracy can be maintained over a longer period of time.

With the device for grinding a spherical end face of a roller-shaped workpiece according to the invention, the outside diameter of the portion that includes the carrier and the grinding wheel is reduced. Further, because reduction in the coaxiality between the first rotary retaining member and the secondary rotary retaining member is prevented, the machining accuracy is improved. In addition, shifting the grinding wheel axis and the central axis of the workpiece allows the curvature of the end face of a workpiece to be adjusted, so that the machining accuracy is further improved.

What is claimed is:

1. A device for grinding a spherical end face of a roller-shaped workpiece, the device comprising:
    a first rotary retaining member that is provided at a first rotary drive shaft and rotates at a predetermined speed;
    a second rotary retaining member that is provided at a hollow second rotary drive shaft disposed so as to be concentric with the first rotary drive shaft, and rotates at a predetermined speed;
    a carrier disposed so as to be rotatable relative to the first rotary retaining member and the second rotary retaining member; and
    a cup-shaped rotary grinding wheel disposed so as to be (i) movable relative to the first rotary retaining member and the second rotary retaining member and (ii) movable in axial and radial directions of the first rotary drive shaft, wherein:
    pressure is applied to the first rotary retaining member or the second rotary retaining member in an axial direction,
    one of the first rotary retaining member and the second rotary retaining member is an inner rotary retaining member that is configured to retain a workpiece at a first point and that has an annular outward rolling surface formed of part of a radially outward tapered surface centering on a central axis of the rotary drive shafts, the other one of the first rotary retaining member and the second rotary retaining member is an outer rotary retaining member that has an annular inward rolling surface formed of part of a radially inward tapered surface centering on the central axis of the rotary drive shafts, and the annular inward rolling surface includes an annular recess at a middle portion thereof so that the outer rotary retaining member is configured to retain the workpiece at second and third points that are separated from each other by the annular recess, the rolling surfaces are opposed to each other, a workpiece supporting portion that is configured to support the workpiece such that the workpiece rotates and revolves as the retaining members rotate is formed at a portion of the carrier, the portion being positioned between the rolling surfaces, and a central axis of the workpiece supportable by the workpiece supporting portion and a central axis of the cup-shaped rotary grinding wheel are each inclined relative to the central axis of the rotary drive shafts at an acute angle.

2. The device for grinding a spherical end face of a roller-shaped workpiece according to claim 1, wherein the outer rotary retaining member is provided with a dressing tool that comes in contact with the rotary grinding wheel and dresses the rotary grinding wheel during grinding.

3. The device for grinding a spherical end face of a roller-shaped workpiece according to claim 1, wherein a virtual plane perpendicular to the central axis of the rotary drive shafts intersects both the first and second rotary drive shafts.

4. The device for grinding a spherical end face of a roller-shaped workpiece according to claim 1, wherein the inner rotary retaining member is disposed, relative to the central axis of the rotary shafts, radially inward of the outer rotary retaining member.

5. The device for grinding a spherical end face of a roller-shaped workpiece according to claim 1, wherein the workpiece is supported by the workpiece supporting portion.

6. The device for grinding a spherical end face of a roller-shaped workpiece according to claim 1, wherein:

in a direction substantially parallel to the central axis of the workpiece, contact length between the annular inward rolling surface and a rolling surface of the workpiece is more than half the length of the rolling surface of the workpiece, and in the direction substantially parallel to the central axis of the workpiece, contact length between the annular outward rolling surface and the rolling surface of the workpiece is less than half the length of the rolling surface of the workpiece.

* * * * *